United States Patent [19]

Wilson et al.

[11] Patent Number: 4,589,514
[45] Date of Patent: May 20, 1986

[54] LOCK FOR VEHICLE HOOD RELEASE FOR THEFT PREVENTION

[75] Inventors: Dennis A. Wilson, McHenry; Dennis W. Anesi, Rolling Meadows, both of Ill.

[73] Assignee: Ansan Industries Limited, Chicago, Ill.

[21] Appl. No.: 758,286

[22] Filed: Jul. 24, 1985

Related U.S. Application Data

[63] Continuation of Ser. No. 507,562, Jun. 24, 1983, abandoned.

[51] Int. Cl.⁴ .............................................. B60R 25/04
[52] U.S. Cl. ........................................ 180/289; 70/241
[58] Field of Search ............ 180/281, 286, 289, 69.21; 49/394; 70/241, 254

[56] References Cited

U.S. PATENT DOCUMENTS

| | | | |
|---|---|---|---|
| 2,861,644 | 11/1958 | Martin | 180/289 |
| 3,282,369 | 11/1966 | Pangborn | 70/241 |
| 3,773,138 | 11/1973 | Killmeyer | 180/289 |
| 3,820,361 | 6/1974 | Leitner | 180/289 |
| 4,099,593 | 7/1978 | Schultz | 180/289 |
| 4,102,164 | 7/1978 | Bonbush | 180/289 |

*Primary Examiner*—John J. Love
*Assistant Examiner*—Mark C. Dukes
*Attorney, Agent, or Firm*—Mathew R. P. Perrone, Jr.

[57] ABSTRACT

A lock for a vehicle hood release prevents theft of the vehicle by being heavily armored and having a housing which is secured to a frame member within a vehicle with device cables protected by an armored tube passing from the passenger compartment, through the firewall and into the engine housing of the vehicle—with an appropriate switch wire or switch wires capable of reentering the passenger compartment from the engine housing by passing through the firewall to a switch or switches in the passenger compartment of the vehicle hidden at a plurality of secretive points.

20 Claims, 12 Drawing Figures

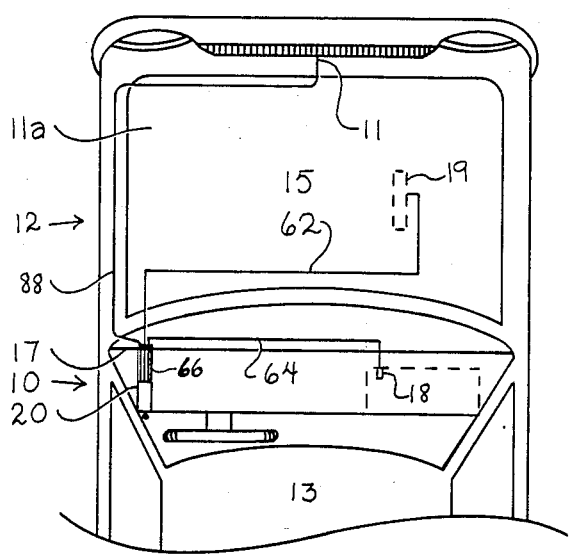
Fig. I
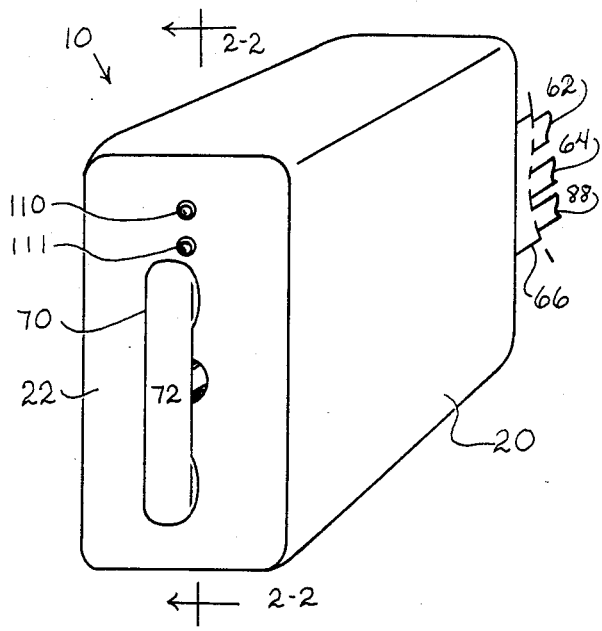
Fig. II
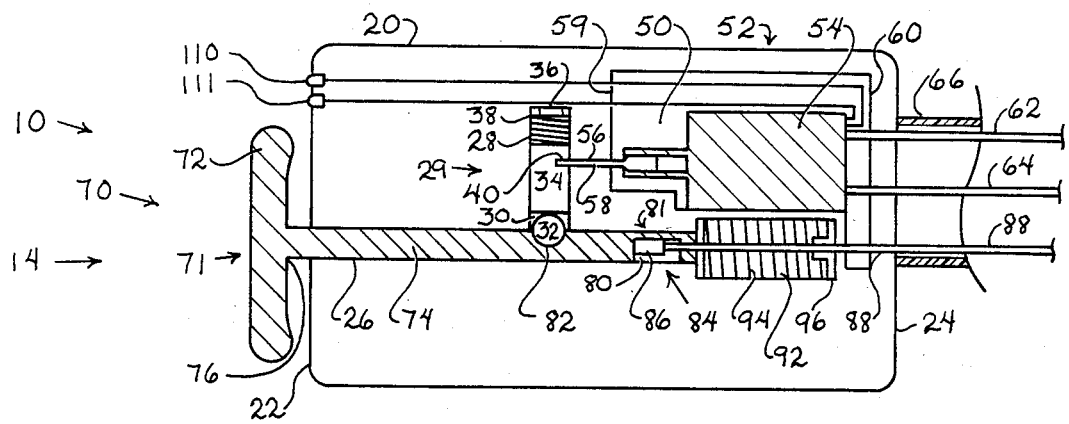
Fig. III
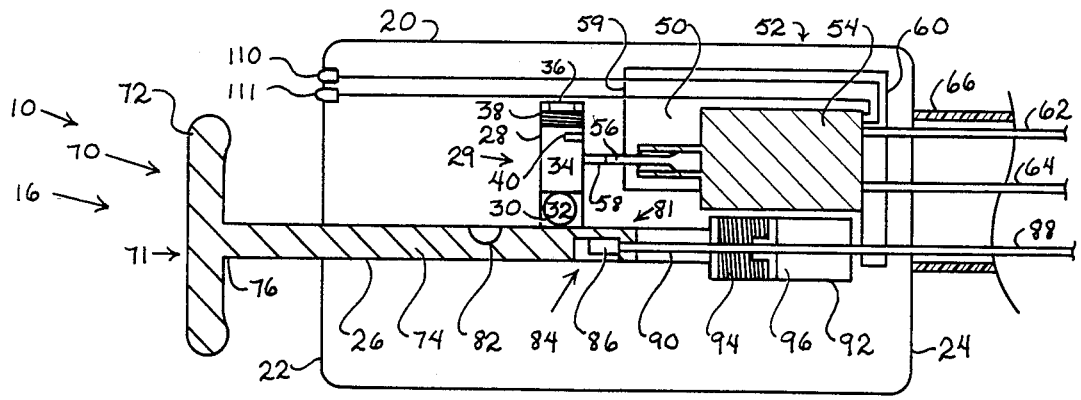
Fig. IV

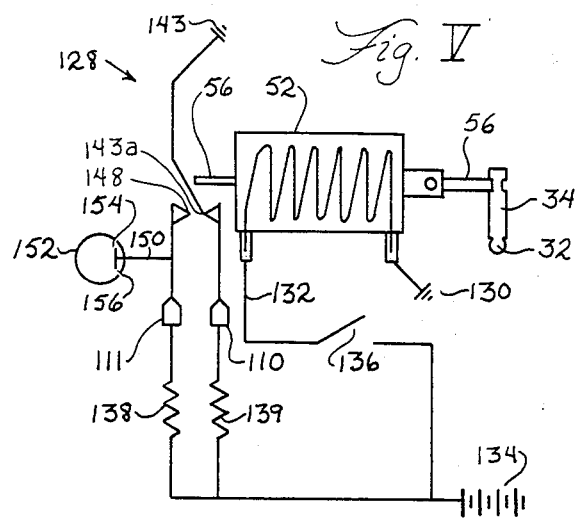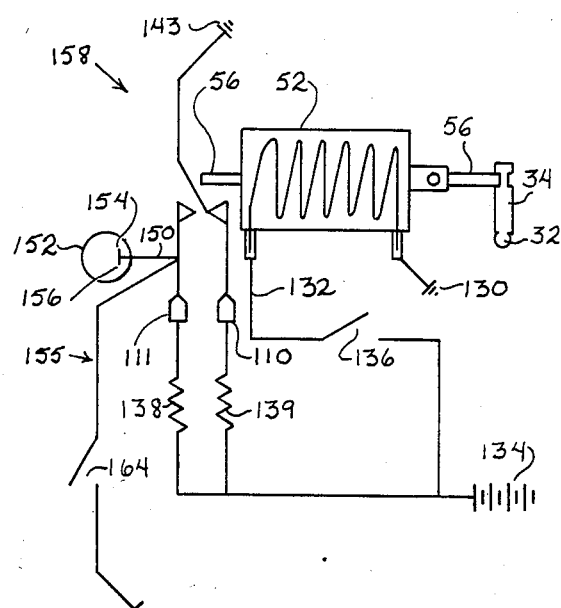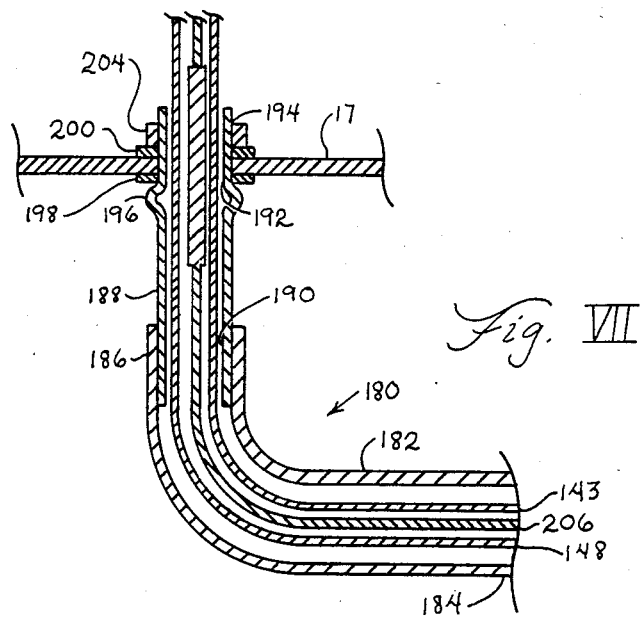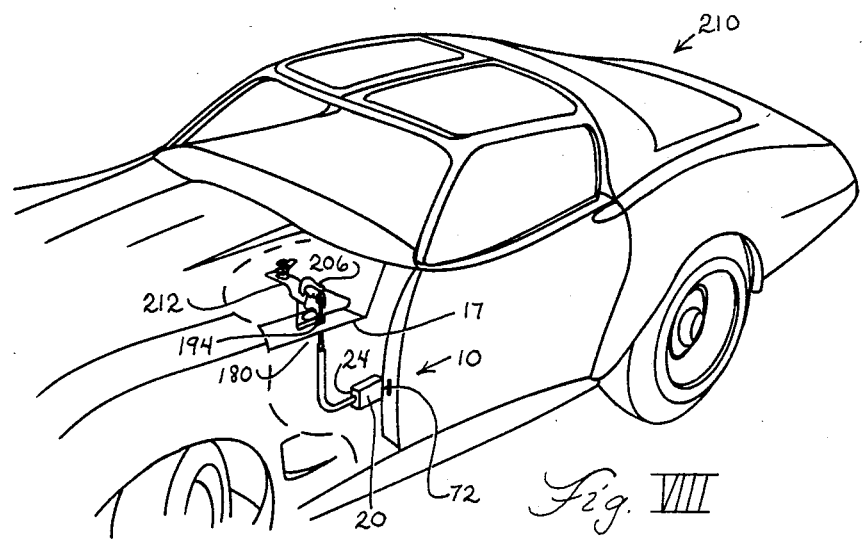

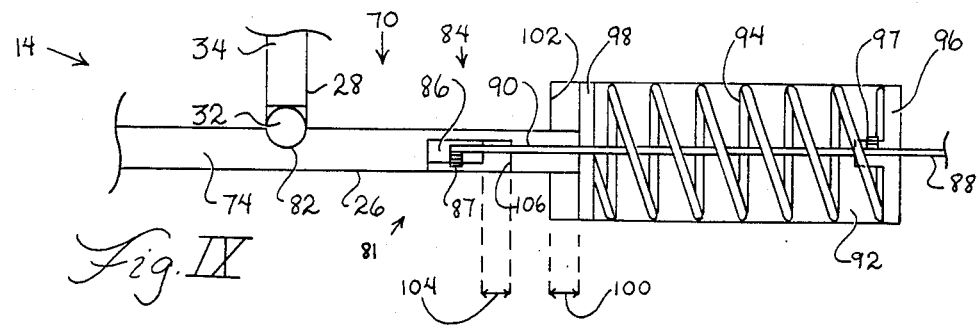
Fig. IX
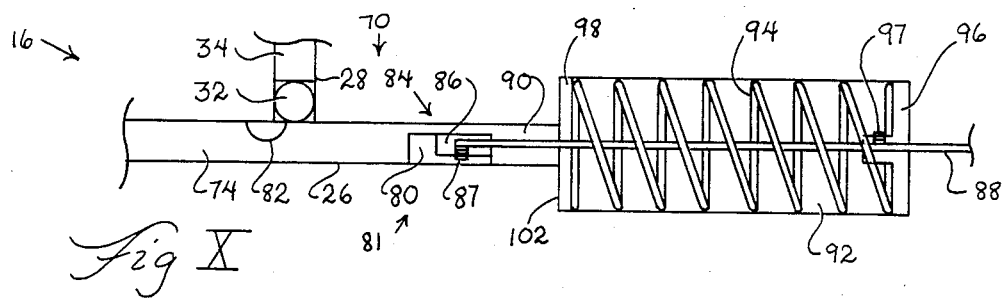
Fig. X
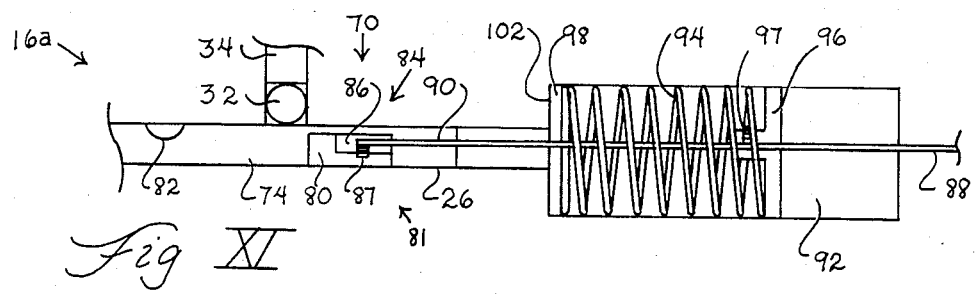
Fig. XI
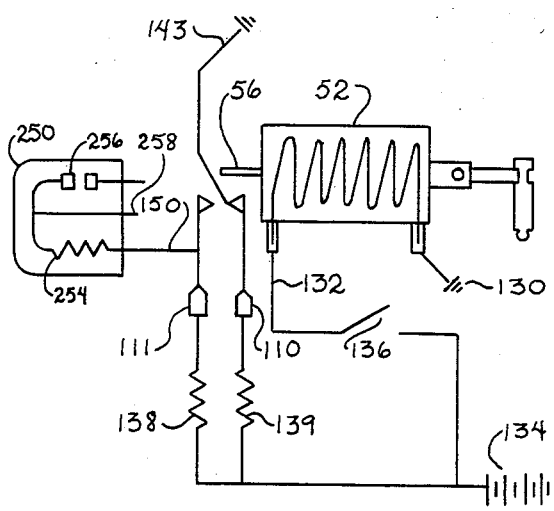
Fig. XII

LOCK FOR VEHICLE HOOD RELEASE FOR THEFT PREVENTION

This application is a continuation of application Ser. No. 06/507,562, filed 6-24-83, now abandoned.

BACKGROUND OF THE INVENTION

This invention relates to a device for preventing the theft of motor vehicles and more particularly to a lock for a vehicle hood release which also disables the ignition coil or starter relay of a motor vehicle.

Vehicle theft in the United States is such a big business that even organized crime is involved. Vehicles are even stolen to order. Because of these developments, a vehicle owner is constantly on the alert for a device which can protect the vehicle.

Some vehicles are extremely susceptible to being stolen. These vehicles are generally in the sports or luxury classes. Within the sports class are the four-wheel drive vehicles and sports automobiles. Typical of the sports automobiles is the Corvette by Chevrolet. The Corvette is such a popular vehicle, that clubs, having membership restricted to Corvette owners, exist from coast to coast in the United States.

Unfortunately, the Corvette is also a very popular vehicle with thieves. In fact, the Corvette has one of the highest rates of being stolen in comparison to other car models. This rate of stealing leads to higher insurance rates and a substantial increase in the cost of ownership. A stolen vehicle is also a great inconvenience for the owner. For these reasons and other reasons, Corvette owners take great pains to protect their vehicles.

The key factor in vehicle theft is time. The more quickly a thief can get the vehicle started and moving, the safer a thief can feel. The main purpose of any antitheft device is to cause the thief to spend such a substantial amount of time in the vehicle that it is dangerous for the thief to remain long enough near the immobile vehicle in his attempt to steal the vehicle. If given enough time, a thief can overcome almost any antitheft device.

In response to this market for devices which prevent or delay vehicle theft, many devices to protect these vehicles are available in the art. In particular, these devices are centered around locking the hood and disabling the ignition so that the vehicle cannot be started. Locking of the hood prevents an ignition bypass. Shorting of the ignition prevents starting of the vehicle even if the ignition switch is pulled. So it is clear that these devices have a use in prevention of vehicle theft.

The combination hood locking and ignition disabling devices suffer from certain problems. First, a resourceful thief can bypass some of these devices. Second, that same thief can merely break off the device and rupture the mechanism used. The thief can also use other methods completing his illegal task.

Also the vehicle owner can have problems with the combination device which locks the hood and disables the ignition. Such a device must be easy to set, easy to release and difficult for a thief to bypass. These features are, at the same time, desirable and contradictory. The features are desirable in that the vehicle is made harder to steal. The features are contradictory because ease of setting and ease of release imply that a thief can easily bypass the device.

It may also be inconvenient for a vehicle to have such a device on the vehicle—especially when the vehicle is left in a valet parking lot. If the device is set with the ignition disabled out, the valet cannot start the vehicle with the key. If the device is not set, access under the hood can be obtained with the resulting loss of the battery or other essential equipment. Thus valet parking can require that the device not be set. The device then becomes useless, unless the hood can be locked without disabling the ignition.

A Corvette hood generally opens from the rear by the windshield as opposed to the front opening of most vehicles. This feature can cause problems with the design of a lock for a hood release, for it is sometimes desirable to leave a lock for a hood release unlocked but have the hood remain secured. If a suitable lock for a hood release can be developed, it must be capable of use as desired. For example, it must be capable of being set, unset with the hood secured (for example, when the hood is to be used frequently), or unset with the hood unsecured or open. In this fashion, both convenience and safety can be provided if desired.

The various models of Corvette require adaptations for a hood release lock in order to permit a one style of hood release lock to fit various models. Such adaptations must be made without weakening the protective capabilities of the device. Such features may well be contradictory due to the desirable quality of such adaptation on the one hand; and the chance of the adaptation permitting the device to be more easily bypassed.

Thus, a device for preventing theft of a vehicle, or at least makes the vehicle more difficult to steal is of great advantage to the art.

SUMMARY OF THE INVENTION

Therefore, it is an object of this invention to provide a device which can delay a vehicle thief.

A further object of this invention to provide a device for preventing or delaying vehicle theft which is difficult to bypass.

A still further object of this invention is to provide a device for preventing or delaying vehicle theft which secures the vehicle hood release.

Yet a further object of this invention is to provide a device for preventing or delaying vehicle theft which disables the ignition or starter.

Also an object of this invention is to provide a device for preventing or delaying vehicle theft which independently secures the hood release without disabling the ignition or starter.

Another object of this invention is to provide a device for preventing or delaying vehicle theft which is easily set.

Still another object of this invention is to provide a device for preventing or delaying vehicle theft which is easily released.

Yet another object of this invention to provide a device for preventing or delaying vehicle theft which is selectively operated.

A further object of this invention is to provide a device for preventing or delaying vehicle theft which is adaptable to various vehicle models without weakening the device.

These and other objects of this invention (which other objects become clear upon consideration of the specification as a whole) are met by providing a device which is secured to a frame member within a vehicle with device cables protected by an armored tube passing through the firewall of the vehicle with an appropriate switch or switches capable of reentering the firewall into the passenger compartment of the vehicle at a plurality of secretive points.

BRIEF DESCRIPTION OF THE DRAWING

FIG. I is a top view of hood release lock 10 of this invention as secured within vehicle 12.

FIG. II is a perspective view of hood release lock 10.

FIG. III depicts a cross-section of hood release lock 10 along Line 2—2 showing set position 14.

FIG. IV depicts a cross-section of hood release lock 10 along Line 2—2 showing unset position 16.

FIG. V depicts a single switch circuit 128 for hood release lock 10 of this invention.

FIG. VI depicts a double switch circuit 158 for hood release lock 10 of this invention.

FIG. VII depicts an adjustable bar assembly 180 for use with hood release lock 10 of this invention.

FIG. VIII depicts a cutaway view of Corvette 210 with hood release lock 10 of this invention installed therein.

FIG. IX depicts a close-up view of latch release assembly 81 showing set position 14.

FIG. X depicts a close-up view of latch release assembly 81 showing unset position 16 with the hood latch 212 secured.

FIG. XI depicts a close-up view of latch release assembly 81 showing unset position 16 with the hood latch 212 unsecured so that the hood may be raised.

FIG. XII depicts FIG. V with a relay 250 replacing transistor 152.

Throughout the Figures of the Drawings, where the same part appears in more than one Figure of the drawing, the same number is assigned thereto.

DESCRIPTION OF THE PREFERRED EMBODIMENTS

A hood release lock provides for disabling of the ignition and locking of the hood, while at the same time being releasable without the use of a key. In this manner, a vehicle owner may prevent or at least delay theft of the vehicle.

Referring now to FIG. I, hood release lock 10 of this invention is shown as being mounted and connected to a hood release 11 of hood 11a in a vehicle 12. Mounting is accomplished by bolting or otherwise securing an armored housing 20 to the frame of vehicle 12 on the driver's side of the vehicle 12 in front of the driver's side door. Ignition wire 62, switch wire 64, and latch release 88 are contained within armored tube 66 between firewall 17 of vehicle 12 and housing 20 of hood release lock 10. Ignition wire 62 is connected at the other end thereof to ignition 19. Switch wire 64 is connected at the other end thereof to switch 18. Switch 18 can be concealed at innumerable places within the passenger compartment 13 of the vehicle 12. Thus all wires are armor protected. Because it passes through the firewall 17 into engine housing 15 and is concealed by hood 11a, and from engine housing 15 back into the passenger compartment 13 of the vehicle 12, the location and use of switch wire 64 is protected.

Referring now to FIG. II, a perspective view of housing 20 of hood release lock 10 is shown from handle end 22. On handle end 22 is grip 72 of handle assembly 70. Above grip 72 and within handle end 22 is a red light emitting diode 110. When hood release lock 10 is in set position 14 (shown in FIG. III) red light emitting diode 110 is lit. Set position 14 locks the hood release 11 and disables the ignition 19. When hood release lock 10 is in unset position 16 (shown in FIG. IV), the vehicle 12 is startable.

FIGS. III and IV are cross-sections of FIG. II along the Section Line 2—2. FIG. III depicts set position 14 of hood release lock 10. FIG. IV depicts unset position 16 of hood release lock 10. By this cross-section, handle end 22 of housing 20 is shown to be oppositely disposed from cable end 24.

Within housing 20 are a plurality of chambers. Handle chamber 26 slideably receives handle assembly 70. Detent chamber 28 receives detent assembly 29. Solenoid chamber 50 receives solenoid 52. Armature chamber 58 is adjacent solenoid chamber 50 and receives armature 56. Latch activation chamber 80 receives latch release assembly 81.

Latch release assembly 81 has three basic positions. In set position 14, the starter or ignition is disabled, so that the vehicle cannot start; and the hood release lock 10 has rendered the hood 11a unopenable. In unset position 16, the vehicle can be started and driven, because hood 11a is still secured. In released position 16a (shown more clearly in FIG. XI), hood latch 212 is released, and hood 11a may be raised.

Detent chamber 28 has its vertical axis substantially perpendicular to the horizontal axis of handle chamber 26. Within and at one end of detent chamber 28 is ball end 30. Ball end 30 is also adjacent handle chamber 26. Situated at ball end 30 is ballbearing 32 slideably mounted within detent chamber 28.

Adjacent ballbearing 32 and within detent chamber 28 is detent block 34. Spring end 36 in detent chamber 28 is oppositely disposed from ball end 30 and has spring 38 secured thereto. In this manner, detent block 34 is spring-loaded in detent chamber 28. Within detent block 34 is a locking aperture 40. Locking aperture 40 is used when hood release lock 10 is in set position 14.

Solenoid chamber 50 has its horizontal axis perpendicular to the vertical axis of detent chamber 28. Solenoid chamber 50 contains solenoid 52. Solenoid 52 includes solenoid body 54 with solenoid armature 56 slideably mounted therein. Solenoid armature 56 is slideably mounted within armature chamber 58. Armature chamber 58 communicates with both detent chamber 28 and solenoid chamber 50. In this manner, solenoid armature 56 may slide through armature chamber 58 and into locking aperture 40 when hood release lock 10 is in set position 14. Solenoid 52 may be a read switching solenoid.

Solenoid chamber 50 has an armature end 59 adjacent armature chamber 58 and connection end 60 oppositely disposed therefrom. At connection end 60, ignition wire 62 and switch wire 64 are electrically connected to solenoid 52. Switch wire 64 may be a two lead wire to power diodes and activate the solenoid. The other end of ignition wire 62 is connected to the ignition 19 of vehicle 12. With hood latch device 10 in set position 14, solenoid armature 56 is in locking aperture 40 which results in the disabling of the ignition 19 so vehicle 12 cannot be started.

The other end of switch wire 64 is operatively connected to switch 18. Operation of switch 18 can release hood release lock 10. Because armored tube 66 is secured to cable end 24 of housing 20 in an armored fashion and extends through the firewall 17 of vehicle with ignition wire 62, switch wire 64, and latch wire 88 contained therein, it is both difficult and time consuming to foil hood release lock 10. Because switch wire 64 does not appear within the passenger compartment 13 of vehicle 12, switch 18 can be concealed in such a plethora of places within the passenger compartment 13 so that switch 18 is extremely difficult—if not impossible to find—unless the person knows where it is.

The relative position of handle assembly 70 determines whether the hood release lock 10 is in set position 14 or unset position 16. Handle assembly 70 is slideably mounted within handle chamber 26. Handle assembly 70 includes handle 71. Handle 71 includes a grip 72 and an actuator 74. Actuator 74 has a grip end 76 adjacent grip 72 and is slideably mounted within handle chamber 26. Grip 72 is used to change hoodlatching device 10 from set position 14 to unset position 16 and the reverse procedure. At the end of actuator 74 opposite grip end 76 is a latch activation chamber 80. Between the latch activation chamber 80 and grip end 76 is ball receiver 82. Ball receiver 82 receives ballbearing 32 when hoodlock device 10 is in set position 14.

Slideably mounted within latch activation chamber 80 is latch connector 84. Latch connector 84 includes latch wire block 86 having latch wire 88 secured thereto. The other end of latch wire 88 operates the hood release 11.

Latch wire 88 passes through latch wire slot 90 into latch spring holding chamber 92. Adjacent handle chamber 26 and within latch spring holding chamber 92 is latch spring 94. Oppositely disposed from handle chamber 26 and within spring holding chamber 92 is latch spring holder 96. Latch spring holder 96 may compress or allow expansion of latch spring 94.

Red light emitting diode 110 and green light emitting diode 111 appear in handle end 22 of housing 20. Red light emitting diode 110 is lit with hood release lock 10 in set position 14, in order to provide a visible indication to the proper vehicle operator that hood release lock 10 is set. Green light emitting diode 111 indicates an engine in operable condition. Connections of red light emitting diode 110 and green light emitting diode are in standard fashion through solenoid 52.

As can be seen in FIG. III, set position 14 of hood latch device 10 shows handle assembly 70 pushed into housing 20. Ballbearing 32 is pushed into ball receiver 82 when detent block 34 is forced against ballbearing 32 by detent spring 38. At the same time solenoid armature 56 is pushed into locking aperture 40 by action of solenoid 52. This is set position 14 with the ignition 19 of vehicle 12 disabled and the hood rendered unopenable.

As can be seen in FIG. IV, unset position 16 of hood latch device 10 shows handle assembly 70 pulled out of housing 20. Ballbearing 32 is pushed into detent chamber 28 and detent block 34 is forced against detent spring 38. At the same time solenoid armature 56 retreats from locking aperture 40 back into solenoid 52. This is unset position 16 with the ignition 19 of vehicle 12 operable and the hood openable.

The switch 18 can be hidden because the switch wire 64 is concealed in an armored cable and passes through the firewall 17. Thus switch wire 64 cannot be seen from inside the passenger compartment. It is, therefore, extremely difficult to locate switch 18. These difficulties serve to delay a prospective car thief sufficiently to make the thief leave the vehicle alone.

Referring now to FIG. V, solenoid 52 is shown in a single switch electrical circuit 128 for hood release lock 10 as a modification and further explanation of switch 18 of the invention. Solenoid ground 130 forms one end of the wiring connection for solenoid 52. Solenoid hot wire 132 is wired to the positive terminal of battery 134.

Solenoid hot wire 132 is protected by armored tube 66 and provides power to hood lock release 10. Between the battery 134 and the solenoid hot wire 132 is battery switch 136. Switch 136 is equivalent to switch 18.

A green resistor 138 is electrically secured to green diode 111, and a red resistor 139 to red diode 110. Green resistor 138 and red resistor 139 may be the same type of resistor but the terms are used here for distinguishing purposes. Red diode 110 is wired at the other end to the red read switch contact 143a. The green diode read switch contact 148 is adjacent to the red diode read switch contact 143. Switch wire 150 runs between green diode 111 and transistor switch 152. Transistor switch 152 is wired to coil 154 and ignition switch 156.

Switch 136 is a momentary switch to energize solenoid 52. This switch 136 operates the indicated green diode 111 and red diode 110 and causes power to the ignition system when energized. Solenoid armature 56 of solenoid 52 52 shifts when energized and remains mechanically locked until released.

Within FIG. VI is the additional modification of switch 18 by an operable switch circuit 155 to render the ignition 19 operable while the hood 11a remains secured. In order to accomplish this feature, green resistor 138 is wired to green diode 111 while a red resistor 139 is wired to red diode 110. Between transistor switch 152, and green diode 111 is wired an operative switch 164. Operative switch 164 is grounded and permits the operation of the ignition 19 while at the same time leaving the hood latch 11 secured. Thus, these are the only changes in the circuitry diagram between FIG. VI and FIG. V. In this fashion, the operative switch 164 used in FIG. VI renders the ignition operable while leaving the hood latched and permits leaving of the car in a valet type parking lot without rendering access to the engine compartment. With operative switch 164 closed, both red diode 110 and green diode 111 are lit—showing the engine operable and hood 11a secured.

In FIG. VII, hood release lock 10 is shown with adjustable bar assembly 180. Adjustable bar assembly 180 is another embodiment of hood release lock 10 and permits hood release lock 10 to be used on a variety of Corvette models. Adjustable bar assembly 180 includes a female nestable piece 182 having a housing end 184 secured to housing 20 in an armored fashion. Oppositely disposed from housing end 184 is receiving end 186.

Male nestable piece 188 fits into receiving end 186 at insertable end 190. Oppositely disposed from insertable end 190 and also as a unitary part of male nestable piece 188 is fire wall end 192 of male nestable piece 188. Insertable end 190 fits adjustably into receiving end 186 and permits hood release lock 10 to be adjustable for various years of Corvette.

Fire wall end 192 of male nestable piece 188 includes threaded section 194 at the end thereof. Stop ridge 196 is an enlarged section of male nestable piece 188 adjacent threaded section 194. Slideably mounted over threaded section 194 and adjacent stop ridge 196 is passenger washer 198. Passenger washer 198 is in the passenger compartment 13 of vehicle 12.

Engine washer 200 is also slideably mounted over threaded section 194, but is within the engine housing 15. Thus, passenger washer 198 and engine washer 200 are on opposite sides of fire wall 17. Passenger washer 198 and engine washer 200 combine to reinforce fire wall 17 at that point. Nut 204 is in threaded relation with threaded section 194 to hold stop ridge 196 tight against passenger washer 198, and to hold passenger washer 198 and engine washer 200 tight against fire wall 17.

In FIG. VIII, a cut-away perspective view of a Corvette 210 is shown with hood release lock 10 installed. Hood latch 212 is shown as it is installed on Corvette 210 with hood release cable 206 secured thereto in standard fashion. Hood release cable 206 is shown as passing through adjustable bar assembly 180. Adjustable bar assembly 180 is shown as passing through firewall 17 at threaded section 194 and secured to cable end 24 of housing 20 at housing end 194. Grip 72 is shown oppositely disposed from cable end 24. In this fashion, the installation of hood release lock 10 in Corvette 210 is shown as feasible.

FIG. IX depicts a closeup view of set position 14 of hood release lock 10. FIG. X depicts a closeup view of unset position 16 of hood release lock 10.

As can be seen when considering FIG. III and FIG. IX together, set position 14 of hood latch device 10 shows handle assembly 70 pushed into housing 20. As above stated, handle assembly 70 includes handle 71. Handle 71 includes a grip 72 and an actuator 74. Actuator 74 has a grip end 76 adjacent grip 72 and is slideably mounted within handle chamber 26. Grip 72 is used to change hoodlatching device 10 from set position 14 to unset position 16 and the reverse procedure. At the end of actuator 74 opposite grip end 76 is a latch activation chamber 80. Between the latch activation chamber 80 and grip end 76 is ball receiver 82. Ball receiver 82 receives ballbearing 32 when hoodlock device 10 is in set position 14.

Slideably mounted within latch activation chamber 80 is latch connector 84. Latch connector 84 includes latch wire block 86 having latch wire 88 secured thereto by setscrew 87. Latch wire 88 can be a standard Bowden cable suitable for activating hood release 11. The other end of latch wire 88 operates the hood release 11.

Latch wire 88 passes through latch wire slot 90 into latch spring holding chamber 92. Adjacent handle chamber 26 and within latch spring holding chamber 92 is latch spring 94. Oppositely disposed from handle chamber 26 and within spring holding chamber 92 is latch spring holder 96. Latch spring holder 96 may compress or allow expansion of latch spring 94 because of latch spring holder 96 being secured to the latch wire 88 by a second set screw 97.

As can be seen in FIG. X (which is a partial, close-up view of handle assembly 70), unset position 16 of hood latch device 10 shows handle assembly 70 pulled out of housing 20. Ballbearing 32 is pushed into detent chamber 28. This is unset position 16 with the ignition 19 of vehicle 12 operable and the hood 11a openable, but without hood release 11 released. This is made possible by latch spring holding chamber 92 having a cap 98 adjacent actuator 74.

Cap 98 is slideably mounted on latch wire 88. Latch spring 94 springloads cap 98 within latch spring holding chamber 92 and against spring chamber end 102. In this fashion cap distance is developed.

The cap distance 100 is between cap 98 and spring chamber end 102 of spring holding chamber 92 is substantially the same as block distance 104 when hood release lock 10 is in set position 14, or unset position 16, or positions therebetween. Block distance 104 is the distance between latch wire block 86 and spring chamber end 106 of latch activation chamber 80.

As can be seen in FIG. XI, hood 11a is now opened and unlatched. Handle assembly 70 is pulled out of housing 20. Ballbearing 32 is out of ball receiver 82 when detent block 34 is forced away from ballbearing 32 by detent spring 38. At the same time solenoid armature 56 is pulled out of locking aperture 40 by action of solenoid 52.

Referring now to FIG. XII (which is a modification of FIG. V), a relay 250 is shown as replacing transistor 152 in proper electrical connection. Relay 250 handles higher current and permits operation of a heavier duty circuit. Like transistor 152, relay 250 is under the hood 11 of the vehicle. Relay 250 has a negative ground through relay coil 254. Relay switch 256 is connected to the starter solenoid (not shown) and to power wire 258 ignition switch (not shown) thereby providing a switch between the starter solenoid and the ignition switch.

Because of the disclosure herein and solely because of the disclosure herein, certain modifications hereof can become apparent to those having ordinary skill in this art. Such modifications are clearly covered hereby.

What is claimed and sought to be secured by Letters Patent of the United States is:

1. A hood release lock for preventing theft of a motor vehicle including means for releasably locking the hood release of said motor vehicle and means for releasably disabling a starting mechanism of said motor vehicle wherein said hood release lock comprises:
    (a) a housing secured to a frame member on the interior of said motor vehicle; wherein said housing for said hood release lock has a handle chamber for slideably receiving a handle means, a detent chamber to receive a detent assembly, a solenoid chamber to receive a solenoid, and a latch activation chamber to receive a latch release assembly;
    (b) a two-piece armored conduit means resistant to cutting or penetration secured to said housing at a cable end of said housing and extending from said housing through a firewall of said vehicle;
    (c) a hood release mechanism, an ignition disabling device, and a battery switch connector all being operatively connected within said housing and contained within said armored conduit;
    (d) a handle means slideably and lockably mounted within said housing at a handle end of said housing;
    (e) said handle means being operatively connected to said hood release mechanism, said ignition disabling device, and said battery switch connector.

2. The hood release lock of claim 1 wherein said housing includes:
    a. a handle chamber for slideably receiving said handle means, a detent chamber to receive a detent assembly, a solenoid chamber to receive a solenoid, a latch activation chamber to receive a latch release assembly;
    b. said detent chamber has a vertical axis substantially perpendicular to a horizontal axis of said handle chamber, a ball end within and at one end of said detent chamber and also adjacent said handle chamber, a ballbearing at said ball end slideably mounted within said detent chamber;
    c. a detent block adjacent said ballbearing and within said detent chamber, a spring end in said detent chamber oppositely disposed from said ball end with a spring secured thereto, thereby rendering said detent block spring-loaded within said detent chamber; and a locking aperture within said detent block;
    d. said solenoid chamber has a horizontal axis perpendicular to the vertical axis of said detent chamber, a solenoid within said solenoid chamber said solenoid including a solenoid body with a solenoid armature slideably mounted within said solenoid body and slideably mounted within an armature chamber said armature chamber communicating with both said detent chamber and said solenoid chamber;

e. said solenoid chamber has an armature end adjacent said armature chamber and a connection end oppositely disposed from said armature end, an ignition wire and a switch wire electrically connected at one end to said connection end; the other end of said ignition wire being connected to an ignition of a vehicle and the other end of switch wire being operatively connected to said battery switch connector;

f. said armored conduit is secured to said cable end of said housing in an armored fashion with said ignition wire, said switch wire, and said latch wire contained therein; thereby providing for said switch to be concealed in such a plethora of places within the passenger compartment of said motor vehicle so that said switch is extremely difficult to find;

g. a latch connector slideably mounted within said latch activation chamber, said latch connector including a latch wire block having a latch wire secured thereto and the other end of latch wire being operatively secured to said hood latch;

h. said latch wire passing through a latch wire slot into a latch spring holding chamber, said latch spring holding chamber being adjacent said handle chamber, a latch spring within said latch spring holding chamber, a latch spring holder oppositely disposed from said handle chamber and within spring holding chamber, said latch spring holder being capable of compressing or allowing expansion of said latch spring; and i. at least one light emitting diode mounted in said handle end of said housing, said light emitting diode being lit with said hood release lock in order to provide a visible indication that said hood release lock is set.

3. The hood release lock of claim 2 wherein said hood release lock has a set position wherein said handle assembly is pushed into said housing, said ball bearing is pushed into ball receiver as said detent block is forced against said ballbearing by said detent spring while at substantially the same time said solenoid armature is pushed into said locking aperture by action of solenoid.

4. The hood release lock of claim 1 wherein said housing for said hood release lock has a handle chamber for slideably receiving said handle means, a detent chamber to receive a detent assembly, a solenoid chamber to receive a solenoid, and a latch activation chamber to receive a latch release assembly.

5. The hood release lock of claim 4 wherein said detent chamber has a vertical axis substantially perpendicular to a horizontal axis of said said handle chamber, a ball end within and at one end of said detent chamber and also adjacent said handle chamber, and a ballbearing at said ball end slideably mounted within said detent chamber.

6. The hood release lock of claim 5 wherein said detent chamber has a detent block adjacent said ballbearing and within said detent chamber, a spring end in said detent chamber oppositely disposed from said ball end with a spring secured thereto, thereby rendering said detent block spring-loaded within said detent chamber; and a locking aperture within said detent block.

7. The hood release lock of claim 6 wherein said solenoid chamber has a horizontal axis perpendicular to the vertical axis of said detent chamber; and a solenoid within said solenoid chamber said solenoid including a solenoid body with a solenoid armature slideably mounted within said solenoid body and slideably mounted within an armature chamber said armature chamber communicating with both said detent chamber and said solenoid chamber.

8. The hood release lock of claim 7 wherein said solenoid chamber has an armature end adjacent said armature chamber and a connection end oppositely disposed from said armature end; and an ignition wire and a switch wire electrically connected at one end to said connection end, the other end of said ignition wire being connected to an ignition of a vehicle and the other end of switch wire being operatively connected to said bypass switch connector.

9. The hood release lock of claim 8 wherein armored conduit is secured to said cable end of said housing in an armored fashion with said ignition wire, said switch wire, and said latch wire contained therein; thereby providing for said switch to be concealed in such a plethora of places within the passenger compartment of said motor vehicle so that said switch for releasing said hood release lock is extremely difficult to find.

10. The hood release lock of claim 9 wherein a latch connector is slideably mounted within said latch activation chamber, said latch connector including a latch wire block having a latch wire secured thereto and the other end of latch wire being operatively secured to said hood latch.

11. The hood release lock of claim 10 wherein said latch wire passes through a latch wire slot into a latch spring holding chamber, said latch spring holding chamber being adjacent said handle chamber, a latch spring within said latch spring holding chamber, and a latch spring holder oppositely disposed from said handle chamber and within spring holding chamber, said latch spring holder being capable of compressing or allowing expansion of said latch spring.

12. The hood release lock of claim 11 wherein said housing further includes at least one light emitting diode mounted in said handle end of said housing, said light emitting diode being lit with said hood release lock in order to provide a visible indication that said hood release lock is set.

13. The hood release lock of claim 12 wherein said hood release lock has a set position wherein said handle assembly is pushed into said housing, said ball bearing is pushed into ball receiver as said detent block is forced against said ballbearing by said detent spring while at substantially the same time said solenoid armature is pushed into said locking aperture by action of solenoid.

14. The hood release lock of claim 13 wherein said housing for said hood release lock has a handle chamber for slideably receiving said handle means, a detent chamber to receive a detent assembly, a solenoid chamber to receive a solenoid, and a latch activation chamber to receive a latch release assembly.

15. A hood release lock for preventing theft of a motor vehicle including means for releasably locking the hood release of said motor vehicle and means for releasably disabling a starting mechanism of said motor vehicle wherein said device comprises:

(a) a housing capable of being secured to a frame member on the interior of a motor vehicle; wherein said housing for said hood release lock has a handle chamber for slideably receiving a handle means, a detent chamber to receive a detent assembly, a solenoid chamber to receive a solenoid, and a latch activation chamber to receive a latch release assembly;

(b) a two-piece armored conduit means resistant to cutting or penetration secured to said housing at a cable end of said housing and extending from said housing through a firewall of said vehicle;

(c) a hood release mechanism, an ignition disabling device, and a battery switch connector all being operatively connected to said housing and contained within said armored conduit;

(d) a handle means slideably and lockably mounted partially within said housing at a handle end of said housing;

(e) said handle means being operatively connected to said hood release mechanism, said ignition disabling device, and said battery switch connector.

16. The hood release lock of claim 15 wherein said two piece armored conduit means includes a female nestable piece and a male nestable piece wherein:

(a) said female nestable piece is secured at one end to said cable end of said housing;

(b) a receiving end for said female nestable piece is oppositely disposed from said cable end of said housing;

(c) an insertable end of said male nestable piece is slideably inserted into said receiving end;

(d) a fire wall end of said male nestable piece is oppositely disposed from said insertable end; and (e) a securing means for securing said fire wall end to said firewall.

17. The hood release lock of claim 16 wherein said securing means includes:

(a) a threaded section on said fire wall end;

(b) an enlarged section of said male nestable piece adjacent said threaded section;

(c) a passenger washer slideably mounted over said threaded section resting on said enlarged section, said passenger washer having an interior diameter less than exterior diameter of said enlarged section and being positioned adjacent said fire wall when said hood release lock is installed in said vehicle;

(d) an engine washer slideably mounted over said threaded section resting adjacent said fire wall in said engine compartment; and (e) a nut in threaded relation with said threaded section.

18. The hood release lock of claim 17 wherein said housing includes:

(a) a handle chamber for slideably receiving said handle means, a detent chamber to receive a detent assembly, a solenoid chamber to receive a solenoid, a latch activation chamber to receive a latch release assembly;

(b) said detent chamber has a vertical axis substantially perpendicular to a horizontal axis of said said handle chamber, a ball end within and at one end of said detent chamber and also adjacent said handle chamber, a ballbearing at said ball end slideably mounted within said detent chamber;

(c) a detent block adjacent said ballbearing and within said detent chamber, a spring end in said detent chamber oppositely disposed from said ball end with a spring secured thereto, thereby rendering said detent block spring-loaded within said detent chamber; and a locking aperture within said detent block;

(d) said solenoid chamber has a horizontal axis perpendicular to the vertical axis of said detent chamber, a solenoid within said solenoid chamber said solenoid including a solenoid body with a solenoid armature slideably mounted within said solenoid body and slideably mounted within an armature chamber said armature chamber communicating with both said detent chamber and said solenoid chamber;

(e) said solenoid chamber has an armature end adjacent said armature chamber and a connection end oppositely disposed from said armature end, an ignition wire and a switch wire electrically connected at one end to said connection end; the other end of said ignition wire being connected to an ignition of a vehicle and the other end of said switch wire being operatively connected to said battery switch connector;

(f) a latch connector slideably mounted within said latch activation chamber, said latch connector including a latch wire block having a latch wire secured thereto and the other end of latch wire being operatively secured to said hood latch;

(g) said latch wire passing through a latch wire slot into a latch spring holding chamber, said latch spring holding chamber being adjacent said handle chamber, a latch spring within said latch spring holding chamber, a latch spring holder oppositely disposed from said handle chamber and within spring holding chamber, said latch spring holder being capable of compressing or allowing expansion of said latch spring; and (h) at least one light emitting diode mounted in said handle end of housing said light emitting diode being lit with said hood release lock in order to provide a visible indication that said hood release lock is set.

19. The hood release lock of claim 18 wherein said hood release lock has a set position wherein said handle assembly is pushed into said housing, said ball bearing is pushed into ball receiver as said detent block is forced against said ballbearing by said detent spring while at substantially the same time said solenoid armature is pushed into said locking aperture by action of solenoid.

20. The hood release lock of claim 17 wherein said housing for said hood release lock has a handle chamber for slideably receiving said handle means, a detent chamber to receive a detent assembly, a solenoid chamber to receive a solenoid, and a latch activation chamber to receive a latch release assembly.

* * * * *